April 7, 1931.  E. SIMMONS  1,799,709
SIGN FOR ADVERTISING AND OTHER PURPOSES
Filed March 11, 1929  2 Sheets-Sheet 1
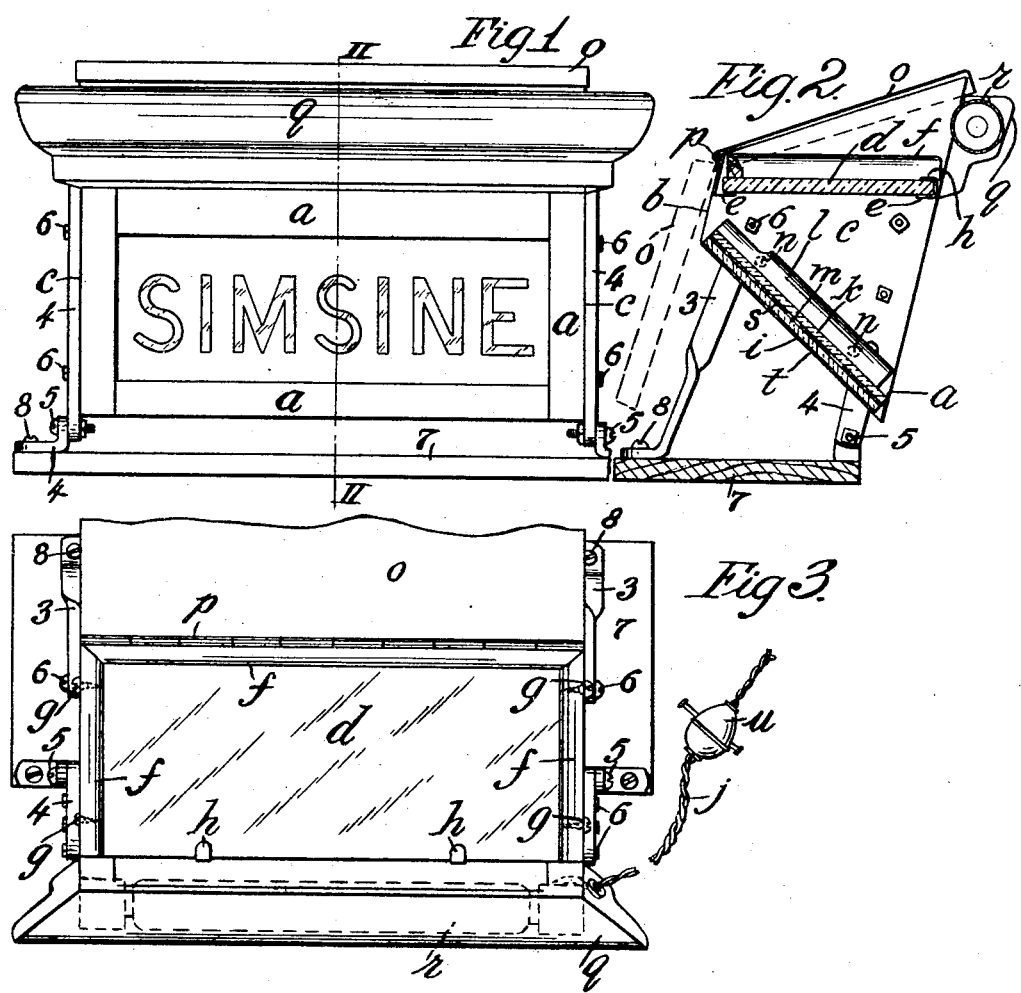

April 7, 1931.  E. SIMMONS  1,799,709
SIGN FOR ADVERTISING AND OTHER PURPOSES
Filed March 11, 1929  2 Sheets-Sheet 2
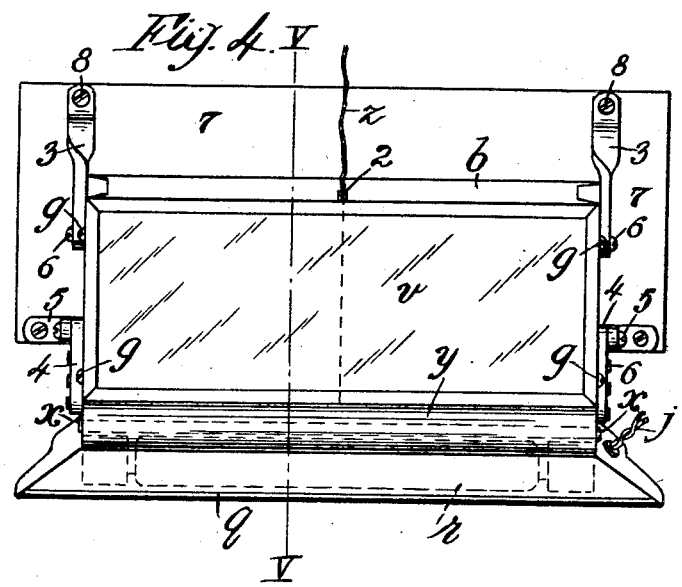
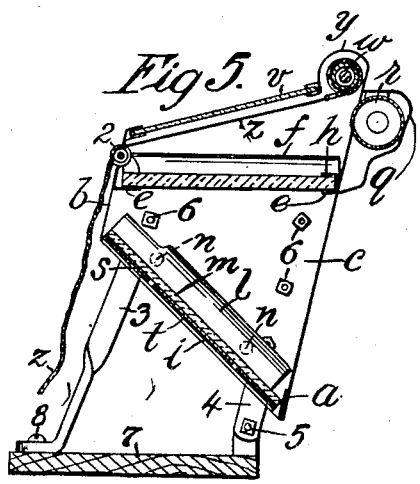
Inventor,
Elias Simmons,
By Henry Orth Jr
atty.

Patented Apr. 7, 1931

1,799,709

UNITED STATES PATENT OFFICE

ELIAS SIMMONS, OF LONDON, ENGLAND

SIGN FOR ADVERTISING AND OTHER PURPOSES

Application filed March 11, 1929, Serial No. 346,215, and in Great Britain March 12, 1928.

This invention relates to signs for advertising and other purposes by means of natural or artificial light and is concerned with signs of the kind comprising a casing, and a reflector which is provided with the advertisement or picture on one face and is arranged in the casing at an angle to the line of sight in direct view of the observer and so that the image is visible by light reflected from the reflector.

The principal object of the present invention is to provide an improved construction of these signs embodying means for rendering the image very clear and prominent and this whether the sign is employed by day or by night.

According to the invention a sign of the above kind is provided which comprises in combination a reflecting surface or mirror formed or provided with a stencil, transparency or the like on its front or rear face or surface, a pane of material of coloured and/or light diffusing nature mounted in the casing so as to lie above the reflecting surface or mirror, and means for the mounting of apparatus, such as an electric lamp or lamps, at the top of the casing for illuminating the reflecting surface or mirror by artificial light. The invention permits the stencil to be illuminated by coloured or diffused light whether the sign be used by day or night, with the result in practice that the image can be made at all times to stand out very clearly and prominently. The stencil or the like may comprise any advertisement text, indication, picture or the like, and its construction may be such that the whole of the mirror or reflecting surface except the advertisement may be masked so as to form a dark background surrounding the brilliant advertisement, or every part of the advertisement may be masked so as to form a brilliant background surrounding the advertisement which will then be dark. The advertisement may be in the form of a stencil or transparency, for example, which is laid on the front surface of the mirror and a pane of plain glass or other suitable translucent material may be fitted over the stencil so as to protect it. Or the stencil may be painted on the mirror or made of paper or other suitable material applied and caused to adhere to the back of the glass before the silvering is effected, and as previously indicated, the reflecting surface of the mirror, which is not masked may form the advertisement or the reflecting surface may surround the advertisement, all according as the latter or the surrounding surface or background is to appear brilliant or dark. The top of the casing may be closed by a movable or hinged shutter, by a blind, or by a screen of coloured and/or light-diffusing material to prevent escape of light or only permit diffused light to pass out of the top of the casing, when the sign is artificially illuminated.

And in order that the invention may be readily understood and carried into effect, reference will be made to the accompanying drawings in which:—

Figure 1 is a front elevation of one convenient form of sign.

Figure 2 is a transverse section on the line II—II of Figure 1 and

Figure 3 is a plan of the sign with part of the lid broken away.

Figure 4 is a plan of a modification and

Figure 5 is a cross section thereof on the line V—V, Figure 4.

On referring to Figures 1, 2 and 3, it will be seen that the sign comprises a framework or casing suitably made of sheet metal and having a rectangular front wall or frame $a$, a rear wall $b$, two end walls $c\ c$, and a back or lower side $i$. Mounted near the top of the casing is a substantially horizontally disposed pane $d$, preferably of coloured glass which may be of any suitable kind such as frosted, ribbed or cathedral glass. This top pane of glass $d$ is adapted to exclude moisture, snow and the like and to diffuse as well as impart colour, to the advertisement, text or the like to be presently described. The said pane of glass $d$ is supported by ledges or flanges $e$ all round the upper part of the casing and is held down by fillets $f$, secured by screws $g$, and/or clips such as are marked $h$ (see Figure 3). The front $a$ of the casing, as shown in Figure 2, is open to form a frame whilst the back or lower side $i$ is inclined and is provided with a mirror or reflecting surface m. A stencil s or the like is placed flat on the mirror and a pane k of plain glass may be laid over the stencil to protect it from damage and atmospheric influences. The back of the mirror may also be protected by a coating of varnish, paint or the like and/or by a piece of tin foil t. The mirror m, stencil s and protective glass front k are secured in position by fillets l fixed by screws n, indicated by dotted circles in Figure 2. A shutter or lid o, adapted for closing the top of the casing, may be hinged to the upper rear edge of the casing at p. The lid o is shown in the closed position in Figures 1 and 2 but in Figure 2 it is also shown by dotted lines in the open position whilst in Figure 3 the part of the lid shown is also in the open position. The front a and ends c of the casing are extended above the pane d of coloured glass to form a casing or chamber q adapted to receive an electric lamp, such as is indicated diagrammatically at r in section in Figure 2 and in dotted lines in Figure 3. The electric leads are indicated at j in Figure 3 and u is a switch for controlling the lamp.

When the sign is to be illuminated by solar or other external light, the hinged lid or shutter o is swung down on its hinges p to the dotted position (Figure 2) at the back of the sign-casing so that light may pass through the pane of coloured glass d and through the open or translucent parts of the stencil s on to the reflecting surface at the back of the mirror m. Consequently, light-rays will be absorbed by the solid or black or more or less opaque parts of the stencil s whilst the open or translucent parts will permit the light-rays to be reflected to an observer from the reflecting surfaces of the mirror m which in reality form the letters or the like of the sign. If it be desired to illuminate the sign by artificial light, the hinged shutter o is turned on its hinges so as to close the top of the casing and the electric lamp r is switched on.

In the event of employing a blind instead of a shutter, the latter is omitted and, as shown in Figures 4 and 5, a screen or pane v of frosted glass or the like, to diffuse the light and coloured if desired, is substituted and the blind, which may be a spring roller-blind w is mounted in brackets x fixed at each end of a hollow, part-cylindrical extension or chamber y of the sign-casing. The blind has a cord z passing over a grooved pulley 2 and when the cord is pulled down sufficiently and the blind is drawn across the top of the sign-casing and secured in any convenient manner against re-rolling, light is excluded from the outside, thus allowing the lamp r to be illuminated without any light therefrom passing through the glass v. Or the spindle or gudgeon at one end of the roller blind and outside of the casing is provided with a grooved pulley or lever to which is attached a cord having two free ends, one or other of which is pulled according as the blind is to be opened or closed. The construction of the blind roller or rollers and the means for operating it or them may be varied as required.

If, however, the screen or pane v be made of frosted or other glass adapted to diffuse light, the shutter or blind may be omitted as the amount of diffused light passing through glass of such a kind will not constitute in some cases a positive disadvantage when the lamp r is alight. For use in daylight it has been found that the pane v of frosted glass will admit sufficient natural light to the mirror for illuminating the sign.

In the construction shown in Figures 4 and 5, the casing is shown provided with a pane of coloured glass d, but this may be dispensed with, if desired, and particularly if the pane of glass v and/or the lamp r admits or emits a coloured light.

In this construction, the glass m for forming the mirror is provided at the back with a stencil s which is caused to adhere closely to the glass. The glass m is then silvered wherever the openings in the stencil allow. After silvering, the whole of the back is painted, varnished or provided with a protective coating and, finally, a piece of tin foil t is caused to adhere to and cover the whole of the back, thus protecting very fully the reflecting surfaces and the stencil against damage and atmospheric influences.

The sign-casing in both constructions is shown as being supported on brackets, of which each of one pair marked 3 is rigid while the others marked 4 are jointed at 5 so as to enable the inclination of the sign to be adjustable according to the height at which the sign is mounted and they are secured to the casing by screws or bolts and nuts 6. The lower ends of the brackets are bent and perforated and fixed to a suitable base 7 by screws or bolts 8. It will, however, be evident that any appropriate rigid or adjustable means for supporting or suspending the sign may be employed.

I claim:

1. A sign or advertising device comprising in combination a casing, a reflector angularly positioned in said casing and provided with a sign on one face thereof, a sheet of light-diffusing material mounted in the casing above said reflector, and means mounted at the top of the casing for illumination of said reflector by artificial light.

2. A sign or advertising device comprising in combination a casing, a reflector angularly positioned in said casing and provided with a sign on one face thereof, a sheet of light-diffusing material mounted in the casing above and at an angle to said reflector, and means for the mounting at the top of the casing of an electric lamp for illuminating said reflector by artificial light.

3. A sign or advertising device comprising in combination a casing open at the front, a reflector angularly positioned in said casing, and provided with a sign on one face thereof, a sheet of translucent material mounted in the casing above and at an angle to said reflector, and means mounted at the top of the casing for the illumination of said reflector by artificial light.

4. A sign or advertising device comprising in combination a casing, a reflector mounted in the lower part of said casing and provided with a sign on one face thereof, a sheet of light-diffusing material mounted in the casing above said reflector, a chamber disposed at the front of said casing above said sheet of light diffusing material, and means in said chamber for the illumination of the sign by artificial light.

5. A sign or advertising device comprising in combination a casing, a reflector mounted in the lower part of said casing and provided with a sign on one face thereof, a sheet of light-diffusing material mounted in the casing above said reflector, a chamber disposed at the front of said casing above said sheet of light-diffusing material, means in said chamber for the illumination of the sign by artificial light, and a movable closure or screen for the top of said casing.

6. A sign or advertising device comprising in combination a casing, a reflector mounted in said casing and provided with a sign on the front face thereof and a superposed sheet of translucent material for the protection of the sign, a sheet of light-diffusing material mounted in the casing above said reflector, and means mounted at the top of the casing for the illumination of said reflector by artificial light.

7. A sign or advertising device comprising a casing, a reflector angularly positioned in said casing and provided with a sign on one face thereof, a sheet of colored light-diffusing material mounted in the casing above said reflector, and means mounted at the top of the casing for illuminating said reflector by artificial light.

ELIAS SIMMONS.